United States Patent
Stoyanov et al.

(10) Patent No.: US 11,643,939 B2
(45) Date of Patent: May 9, 2023

(54) SEALS AND METHODS OF MAKING SEALS

(71) Applicant: Raytheon Technologies Corporation, Farmington, CT (US)

(72) Inventors: Pantcho P. Stoyanov, West Hartford, CT (US); Eli N. Ross, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 127 days.

(21) Appl. No.: 17/009,907

(22) Filed: Sep. 2, 2020

(65) Prior Publication Data

US 2022/0065122 A1    Mar. 3, 2022

(51) Int. Cl.
| | |
|---|---|
| *B23K 9/04* | (2006.01) |
| *F01D 11/00* | (2006.01) |
| *F16J 15/08* | (2006.01) |
| *F16J 15/16* | (2006.01) |
| *B23K 103/10* | (2006.01) |

(52) U.S. Cl.
CPC .............. *F01D 11/003* (2013.01); *B23K 9/04* (2013.01); *F16J 15/0806* (2013.01); *F16J 15/16* (2013.01); *B23K 2103/10* (2018.08); *F05D 2240/55* (2013.01); *F05D 2300/177* (2013.01)

(58) Field of Classification Search
CPC .. F16J 15/16; F16J 15/0806; F05D 2300/177; F05D 2240/55; F01D 11/003; B23K 9/04; B23K 2103/10
See application file for complete search history.

(56) References Cited

U.S. PATENT DOCUMENTS

| | | | |
|---|---|---|---|
| 10,668,566 | B2 | 6/2020 | Smathers et al. |
| 2016/0003080 | A1* | 1/2016 | Mcgarrah ............... F01D 11/08 |
| | | | 415/173.1 |
| 2016/0312894 | A1 | 10/2016 | McCaffrey et al. |
| 2016/0319936 | A1 | 11/2016 | Dubois |
| 2017/0030214 | A1 | 2/2017 | Strock et al. |
| 2017/0335704 | A1* | 11/2017 | Davis ................... F01D 11/005 |
| 2019/0010702 | A1 | 1/2019 | Lloyd |
| 2019/0017401 | A1* | 1/2019 | Stoyanov ................ F16J 15/16 |

(Continued)

FOREIGN PATENT DOCUMENTS

| | | | |
|---|---|---|---|
| CN | 110117788 | A * | 8/2019 |
| CN | 110938770 | | 3/2020 |

(Continued)

OTHER PUBLICATIONS

Wikipedia, "High-entropy alloys", Published Aug. 16, 2020. [retrieved on Sep. 16, 2022]. Retrieved from the Internet <URL: https://en.wikipedia.org/w/index.php?title=High-entropy_alloys&oldid=973336914>.*

(Continued)

*Primary Examiner* — Igor Kershteyn
*Assistant Examiner* — Theodore C Ribadeneyra
(74) *Attorney, Agent, or Firm* — Carlson, Gaskey & Olds, P.C.

(57) ABSTRACT

A tribological and creep resistant system configured to operate at temperatures in excess of 700° C. A seal body extends between a leading edge and a trailing edge. A first component contact surface is adjacent the leading edge and a second component contact surface is adjacent the trailing edge. The seal body is formed from a high entropy alloy.

21 Claims, 3 Drawing Sheets

(56) References Cited

U.S. PATENT DOCUMENTS

| | | |
|---|---|---|
| 2019/0226058 A1 | 7/2019 | Fujieda |
| 2020/0261980 A1 | 8/2020 | Mironets |
| 2020/0290118 A1 | 9/2020 | Chen et al. |

FOREIGN PATENT DOCUMENTS

| | | | |
|---|---|---|---|
| CN | 111334697 A | * | 6/2020 |
| EP | 3085902 | | 10/2016 |

OTHER PUBLICATIONS

European Search Report for EP Application EP 21194652.0 dated Jan. 31, 2022.

* cited by examiner

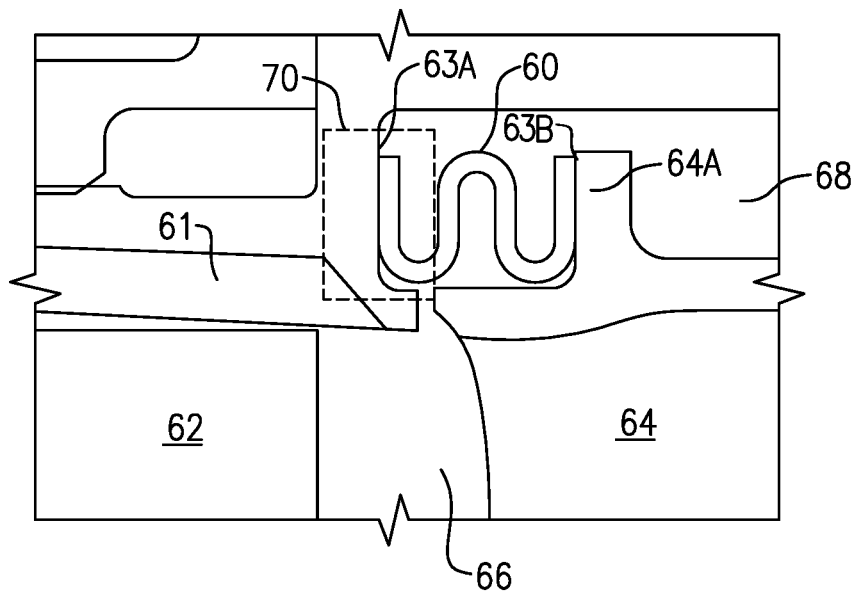
FIG.2
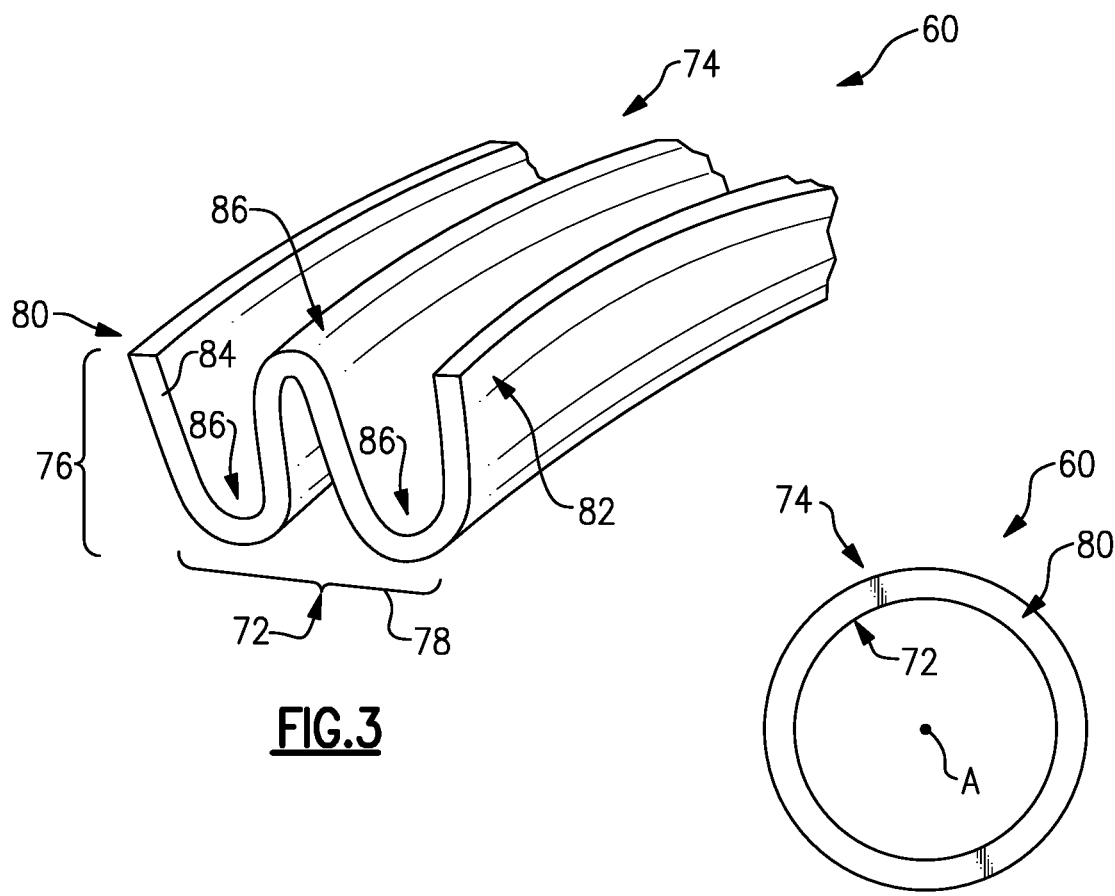
FIG.3
FIG.4

SEALS AND METHODS OF MAKING SEALS

BACKGROUND

This disclosure relates to seals and the materials and methods for making the seals. Seals are widely used in various applications to contain a fluid in a desired area of a piece of equipment. Many different types of materials can be used to fabricate seals according to many different types of design. For example, stationary seals are attached to a fixed component and create a seal with another fixed component or a moving component. Alternatively, a seal may move with one component to create a seal with another component hat is fixed or moves. Both moving and stationary seals can be subject to wear and other undesirable effects from friction between the seal and a contact surface on a component.

Systems that operate in extreme environments, such as the high temperatures and pressures experienced inside a gas turbine engine, must be able to withstand these environments while still exhibiting favorable wear characteristics. Historically, seals in gas turbine engines have been made from various materials, such as INCONEL® 718, INCONEL X-750, or other nickel-based alloys. However, as operating temperatures within the gas turbine engine increase, there is a need for seals that can withstand these environments.

SUMMARY

In one exemplary embodiment, a tribological and creep resistant system configured to operate at temperatures in excess of 700° C. includes a seal body that extends between a leading edge and a trailing edge. A first component contact surface is adjacent the leading edge and a second component contact surface is adjacent the trailing edge. The seal body is formed from a high entropy alloy.

In a further embodiment of any of the above, the seal body forms a complete ring.

In a further embodiment of any of the above, the system is configured to operate at temperatures up to 900° C.

In a further embodiment of any of the above, a gas turbine engine with the seal body is located radially outward of a core airflow path through the gas turbine engine in a turbine section of the gas turbine engine.

In a further embodiment of any of the above, a gas turbine engine with the seal body is located radially outward of a core airflow path through the gas turbine engine in a high pressure compressor of the gas turbine engine.

In a further embodiment of any of the above, the seal body includes at least one bend.

In a further embodiment of any of the above, the at least one bend includes multiple bends on one of a radially inner side or a radially outer side of the seal body. Only a single bend is on the other of the radially inner side or the radially outer side.

In a further embodiment of any of the above, a first component engages the first component contact surface on the leading edge of the body seal. A second component engages the second component contact surface on the trialing edge of the body seal.

In a further embodiment of any of the above, the first component is a vane and the second component is a blade outer air seal.

In a further embodiment of any of the above, a first component defines a groove that seats a radially inner portion of the seal body. The seal body defines a piston seal.

In a further embodiment of any of the above, the first component is a mid-turbine frame vane and the groove is located on a radially outer portion of the mid-turbine frame vane.

In a further embodiment of any of the above, the high entropy alloy includes one of MoNbTaW, AlCoCrFeNiTi, or CoCrFeMnNi.

In another exemplary embodiment, a method includes providing a powdered high entropy alloy. The powdered high entropy alloy is formed into a seal body with a heat source. The seal body extends between a leading edge and a trailing edge. A first component contact surface is adjacent the leading edge and a second component contact surface is adjacent the trailing edge and is configured to operate at temperatures in excess of 700° C.

In a further embodiment of any of the above, the powdered high entropy alloy utilizes a powdered bed of the high entropy alloy. Forming the powdered high entropy alloy into the seal body with the heat source includes welding or melting adjacent layers of the high entropy alloy in the powdered bed to form a desired shape of the seal body.

In a further embodiment of any of the above, providing the powdered high entropy alloy includes blowing streams of the powdered high entropy alloy.

In a further embodiment of any of the above, forming the powdered high entropy alloy into a seal body with the heat source includes controlling the heat source to weld or melt the high entropy alloy into a desired shape of the seal body.

In a further embodiment of any of the above, the seal body extends from a leading edge to a trailing edge and includes at least one bend.

In a further embodiment of any of the above, the seal body extends from a leading edge to a trailing edge and defines a piston seal.

In a further embodiment of any of the above, the seal body forms a complete ring of sufficient diameter to surround a core air flow path in a gas turbine engine.

In a further embodiment of any of the above, the powdered high entropy alloy includes one of MoNbTaW, AlCoCrFeNiTi, or CoCrFeMnNi.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 is a schematic view of an example seal located in the gas turbine engine of FIG. 1.

FIG. 3 is a partial perspective view of the seal of FIG. 2 illustrating a cross section of the seal.

FIG. 4 is an axial view of the seal of FIG. 2.

DETAILED DESCRIPTION

Figure 1:
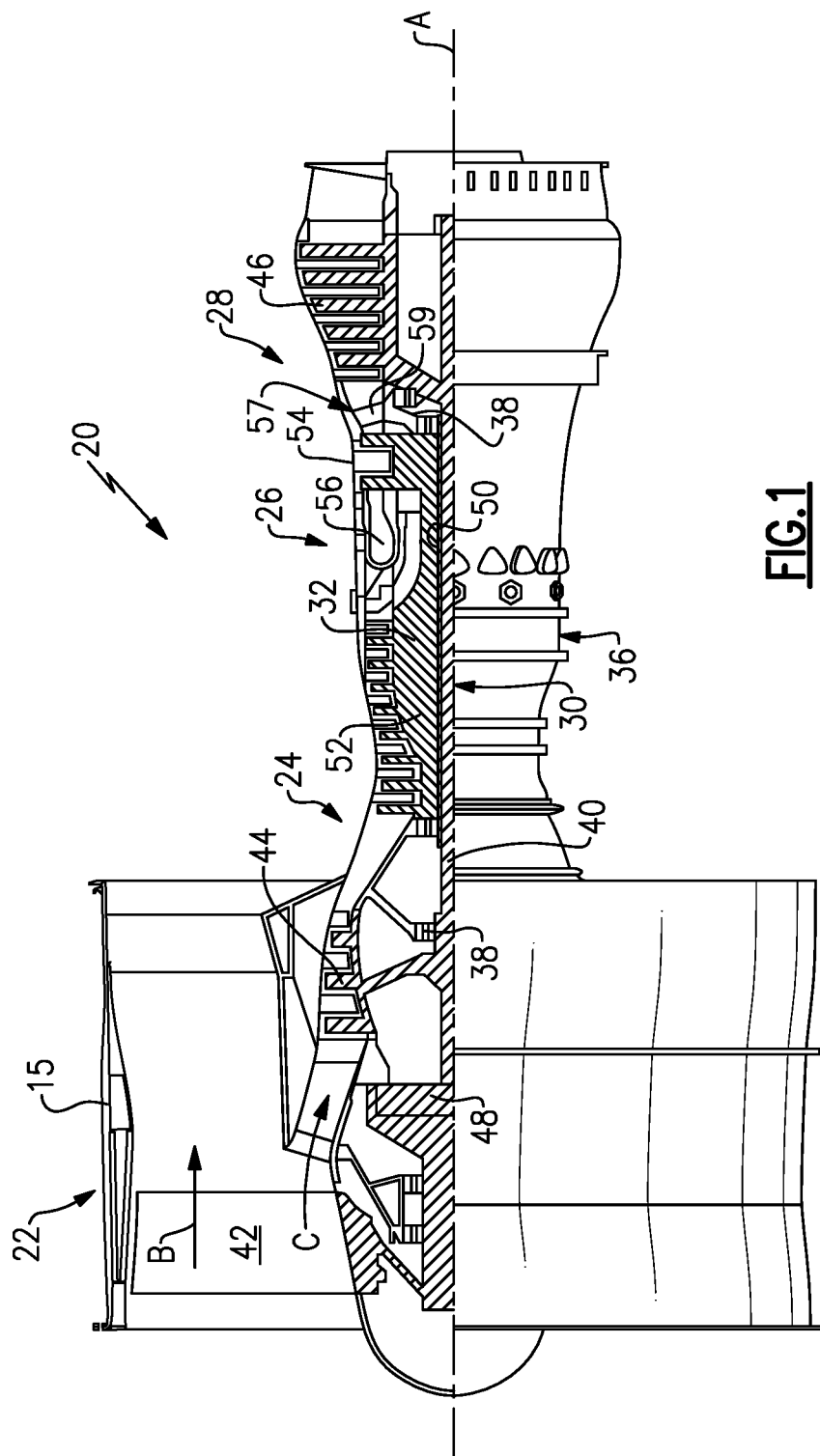
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

FIG. 2 illustrates an example seal 60, such as a "W"-shape seal, in contact with a first counterface 63A located upstream of the seal 60 and a second counterface 63B located downstream of the seal 60. In the illustrated example, the seal 60 is located in the high pressure turbine 54. However, the seal 60 could be located in other parts of the gas turbine engine 20 such as the compressor section 24, the combustor section 26, or other areas of the turbine section 28. An upstream portion of the seal 60 engages the first counterface 63A on a blade outer air seal 61, such as a ceramic blade outer air seal, adjacent a turbine blade 62. A downstream portion of the seal 60 engages the second counterface 63B on a structure 64A, such as a vane hook, on a vane, such as an exit guide vane 64. The seal 60 creates a separation or barrier between a hot fluid area 66 and a cold fluid area 68. Wear typically occurs in a wear area 70 that includes the seal friction surface on the seal 60. In one example, the seal 60 is configured to operate in the gas turbine engine 20 at temperatures in excess of 700° C. and in another example, the seal 60 is configured to operate in the gas turbine engine 20 at temperatures in excess of 900° C.

As shown in FIGS. 2-4, the seal 60 has an inner diameter 72, an outer diameter 74, a radial height 76, and a width 78 in an axial direction. The seal 60 includes a body portion 84 extending between a leading edge 80 and a trailing edge 82. The seal 60 further includes a plurality of bends 86 disposed between the leading edge 80 and the trailing edge 82. The plurality of bends 86 can be any one of a trough, ridge, or other geometric profile. In the illustrated example, the seal 60 includes two bends adjacent the inner diameter 72 and a single bend adjacent the outer diameter 74. However, other bend configurations could include at least one bend adjacent either the leading edge 80 or the trailing edge 82 or both the leading and trailing edges 80, 82.

The body portion 84 defines a complete ring without any separations or discontinuities in the circumferential or axial directions. Alternatively, the body portion 84 may include a separation or discontinuity and not form a complete ring. In this disclosure, radial or radially, axial or axially, and circumferential or circumferentially is in relation to the engine axis A unless stated otherwise. Additionally, upstream and downstream is in relation to a general direction of air flow through a core of the gas turbine engine 20 unless stated otherwise.

In the illustrated example, the cross-sectional shape is a two-dimensional shape represented by a cross-section of the seal 60 with the cross-sectional shape being substantially the same at a plurality of circumferential locations around the seal 60. While the seal 60 is illustrated with a cross-sectional shape in the form of a "W," the seal 60 can be of any shape for the application in which it is used such that the seal's shape is application-specific. In other embodiments, the cross-sectional shape of the seal can be an "O"-shape, a "C"-shape, an "E"-shape, a "M"-shape, a "U"-shape, a Diamond-shape, a Dogbone-shape, a Feather-shape, a Bathtub-seal shape, a Wire-seal shape, or any other geometric shape.

Figure 5:
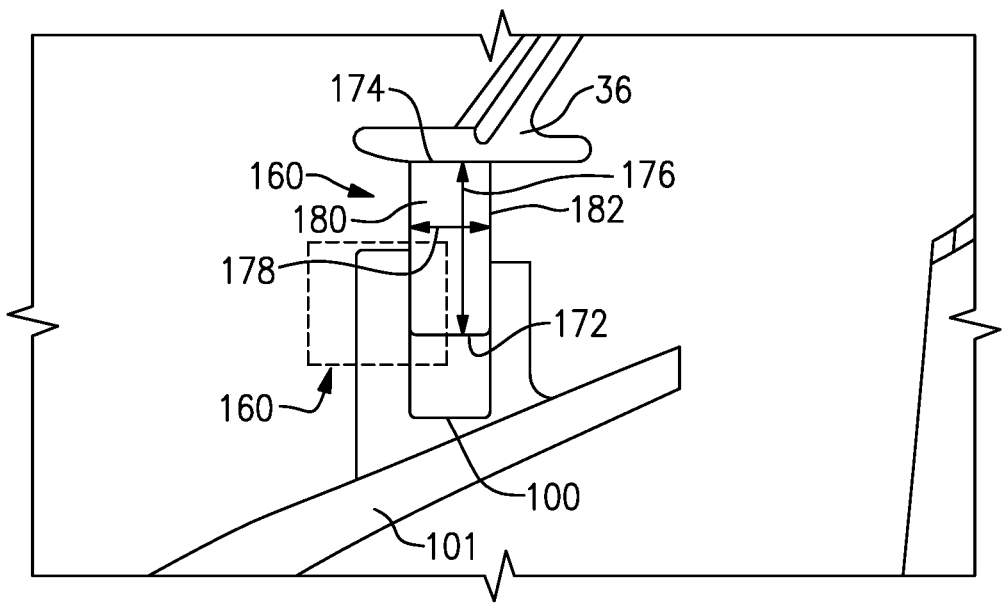
FIG. 5 is a schematic view of an example piston seal located in the gas turbine engine of FIG. 1.
Figure 6:
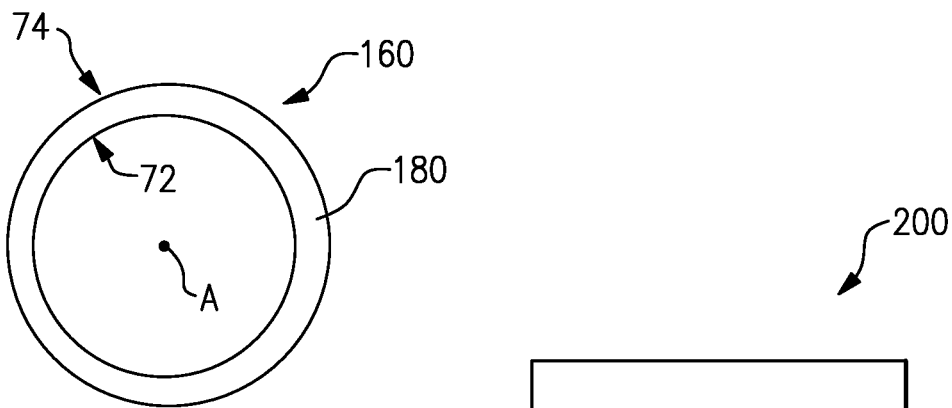
FIG. 6 illustrates an axial view of the piston seal of FIG. 5

FIGS. 5 and 6 illustrate another example seal, such as a piston seal 160. The piston seal 160 is similar in composition and manufacturing as the seal 60 except where described below or shown in the Figures. In the illustrated example, the piston seal 160 is disposed in a mid-turbine frame vane 101 aft outside diameter seal groove 100 and against a portion of the engine static structure 36. In this example embodiment, wear typically occurs in a year area 170 that includes the seal friction surface on the seal 160 and a corresponding counterface on the mid-turbine frame vane 101 with the mid-turbine frame vane 101 being formed from a nickel-based alloy, such as Mar-M247.

The seal 160 has an inner diameter 172, an outer diameter 174, a radial height 176, and a width 178 in an axial direction. In the illustrated example, the height 176 is greater than the width 178, such that the seal 160 includes a rectangular cross section. The seal 160 includes a body portion 184 extending from a leading edge 80 to a trailing edge 82. The body portion 184 follows a constant cross-sectional shape and forms a complete ring without any separations or discontinuities in a circumferential or axial direction. Alternatively, the seal 160 could include a separation or discontinuity.

The seals 60, 160 are formed from high entropy alloys ("HEA"), such as MoNbTaW, AlCoCrFeNiTi, or CoCrFeMnNi. However, other HEAs could be used. Conventional alloys used in gas turbine engines 20 include one or possibly two main elements with the addition of several other elements in relatively small amounts. Conversely, HEAs are formed from multiple principal elements in high concentrations and can be compositionally tailored to include self-lubrication and wear resistant properties at elevated temperatures.

Table 1 below illustrates an example composition for CoCrFeMnNi. A similar composition range can also be used for the MoNbTaW and AlCoCrFeNiTi.

TABLE 1

| Element | Co | Cr | Fe | Mn | Ni | Ti | Al | C | O |
|---|---|---|---|---|---|---|---|---|---|
| CoCrFeMnNi | 17.04 | 15.43 | 16.97 | 15.68 | 17.82 | 15 | 0.9 | 1.02 | 0.13 |

In one example, the seals 60, 160 are made through an additive manufacturing process from the HEA. Unlike conventional alloys, HEA are not typically formed directly from casting or ingot+wrought processes. In one example, the seals 60, 160 are formed through a powder bed system with a computer controlled heat source, such as with a selective laser melting process or an electron beam melting process. With the powdered bed system, the heat source is applied to the powdered HEA forming a layer in a powdered bed to weld or melt the powdered HEA. Additional layers of powdered HEAs can be added after welding or melting existing layers to form the final shape of the seal 60, 160.

In another example, the seals 60,160 could be formed through a powder feed system with a computer controlled heat source, such as with a laser direct deposition process or a laser engineered net shaping ("LENS") process. The LENS process uses computer-controlled lasers to weld air-blown streams of powdered HEAs into the desired shape for the seals 60, 160. One feature of the LENS process is the ability to generate a seal with sufficient precision in a complex geometry without additional machining steps to achieve a finished seal.

The LENS process, as well as the other HEA forming processes discussed above, allow for the formation of complex geometries of the seals 60, 160 with a large enough scale to form a circumferential ring on a radially outer side of the core air flow path C in the gas turbine engine 20. This is an improvement over prior art designs, such as seals formed from a polycrystalline or single crystal nickel alloy, which are difficult to form in a complex shape with a diameter large enough to surround a core air flow path C in the gas turbine engine 20 and/or withstand elevated operating temperatures of the gas turbine engine 20. Additionally, seals formed directly from cast feedstock may include a joining-related discontinuity formed between opposite ends of the seal 60 which creates a possible leakage path through the seal 60 and can cause an increased amount of hot gases from the core air flow path C mixing with the cold fluid area 68 or another cold fluid area in the gas turbine engine 20.

Another feature of the seal 60 formed from HEAs, such as MoNbTaW, is the formation of a solid lubricant between the seal 60, 160 and a counterface. During operation of the gas turbine engine 20, the seal 60, 160 is in contact with a counterface at elevated temperatures and exhibits a fretting motion with low wear and low friction. The low wear and low friction between the seal 60 and the counterface is at least partially attributed to the formation of a metal oxide that forms the solid lubricant. The metal oxide can also transfer to the counterface and further reduce friction and heating associated with the frictional forces during operation of the gas turbine engine 20.

Additionally, a low friction coefficient and high wear resistance of the seal 60 can also be obtained at low temperatures, such as during engine load fluctuations, and is at least partially attributed to the formation of a Ta-based tribofilm in the case of using MoNbTaW. However, other tribofilms can formed when using other HEAs. Although the above example is with respect to a specific HEA material, other HEA materials exhibit similar properties during both high and low temperature operations.

One feature of the seals 60, 160 made from HEAs is an increased time interval between overhauls of the gas turbine engine 20 and a reduction in the number of parts needed to be replaced during an overhaul because of the improved sealing and wear characteristics of the seals 60, 160. Additionally, the low frictional performance of the seals 60, 160 results in less wear on the counterface of the components which extends the life of the component and reduces the number of parts replaced during an overhaul.

Figure 7:
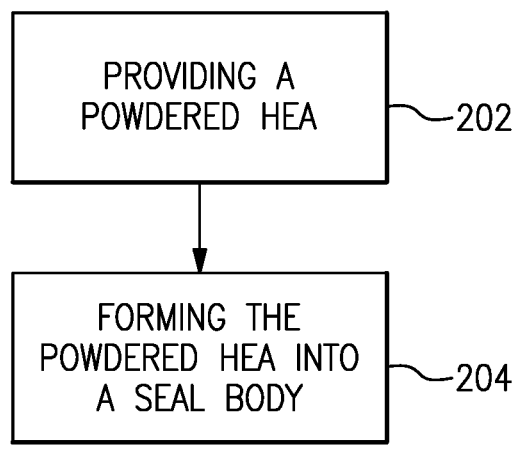
FIG. 7 illustrates a method of creating a seal from a high entropy alloy.

FIG. 7 illustrates a method 200 of creating the seals 60, 160. The method includes providing (202) a powdered HEA, such as MoNbTaW, AlCoCrFeNiTi, or CoCrFeMnNi. The powdered HEA is formed (204) into the shape of the seal 60, 160 through exposure to a heat source, such as a laser beam or an electron beam as described above. In one example, the powdered HEA is air blown while a computer controller laser welds the stream of powdered HEA into the desired shape of the seal 60, 160. Furthermore, the precision of the computer-controlled laser is sufficiently precise to allow the seals 60, 160 to be formed without the need for additional machining of an exterior surface of the seal 60, 160, which reduces the number of steps to create the seal 60, 160.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A tribological and creep resistant system configured to operate at temperatures in excess of 700° C., comprising:
   a seal body extending between a leading edge and a trailing edge including a first component contact surface adjacent the leading edge and a second component contact surface adjacent the trailing edge,
   wherein the seal body is formed from a high entropy alloy that includes MoNbTaW.

2. The system of claim 1, wherein the seal body forms a complete ring.

3. The system of claim 1, wherein the system is configured to operate at temperatures up to 900° C.

4. The system of claim 1, further comprising a gas turbine engine with the seal body located radially outward of a core airflow path through the gas turbine engine in a turbine section of the gas turbine engine.

5. The system of claim 1, further comprising a gas turbine engine with the seal body located radially outward of a core airflow path through the gas turbine engine in a high pressure compressor of the gas turbine engine.

6. The system of claim 2, wherein the seal body includes at least one bend.

7. The system of claim 6, wherein the at least one bend includes multiple bends on one of a radially inner side or a radially outer side of the seal body and only a single bend on the other of the radially inner side or the radially outer side.

8. The system of claim 7, further comprising:
   a first component engaging the first component contact surface on the leading edge of the body seal and a second component engaging the second component contact surface on the trailing edge of the body seal.

9. The system of claim 8, wherein the first component is a vane and the second component is a blade outer air seal.

10. The system of claim 2, further comprising:
    a first component defining a groove that seats a radially inner portion of the seal body, wherein the seal body defines a piston seal.

11. The system of claim 10, wherein the first component is a mid-turbine frame vane and the groove is located on a radially outer portion of the mid-turbine frame vane.

12. A tribological and creep resistant system configured to operate at temperatures in excess of 700° C., comprising:
    a seal body extending between a leading edge and a trailing edge including a first component contact surface adjacent the leading edge and a second component contact surface adjacent the trailing edge,
    wherein the seal body is formed from a high entropy alloy that includes CoCrFeMnNi.

13. The system as recited in claim 12, wherein the CoCrFeMnNi is formed from 17.04% Co, 15.43% Cr, 16.97% Fe, 15.68% Mn, 17.82% Ni, 15% Ti, 0.9% Al, 1.02% C, and 0.13 O.

14. The system of claim 12, wherein the seal body forms a complete ring.

15. The system of claim 14, wherein the seal body includes multiple bends on one of a radially inner side or a radially outer side of the seal body and only a single bend on the other of the radially inner side or the radially outer side.

16. The system of claim 15, further comprising:
    a first component engaging the first component contact surface on the leading edge of the body seal and a second component engaging the second component contact surface on the trailing edge of the body seal.

17. The system of claim 16, wherein the first component is a vane and the second component is a blade outer air seal.

18. The system of claim 14, further comprising:
    a first component defining a groove that seats a radially inner portion of the seal body, wherein the seal body defines a piston seal and the first component is a mid-turbine frame vane and the groove is located on a radially outer portion of the mid-turbine frame vane.

19. The system of claim 12, wherein the system is configured to operate at temperatures up to 900° C.

20. The system of claim 12, further comprising a gas turbine engine with the seal body located radially outward of a core airflow path through the gas turbine engine in a turbine section of the gas turbine engine.

21. The system of claim 12, further comprising a gas turbine engine with the seal body located radially outward of a core airflow path through the gas turbine engine in a high pressure compressor of the gas turbine engine.

* * * * *